(12) United States Patent
Dobos et al.

(10) Patent No.: US 11,526,391 B2
(45) Date of Patent: Dec. 13, 2022

(54) REAL-TIME COGNITIVE ROOT CAUSE ANALYSIS (CRCA) COMPUTING

(71) Applicant: KYNDRYL, INC., New York, NY (US)

(72) Inventors: Zoltan Dobos, Székesfehérvár (HU); Alan Piciacchio, Wappingers Falls, NY (US); Ivan Peter Orlik, Székesfehérvár (HU); Attila Sasvari, Székesfehérvár (HU); Angela Hillenbrand, Warren, MI (US); Christopher Tobey, Apex, NC (US)

(73) Assignee: Kyndryl, Inc., New York, NY (US)

( * ) Notice: Subject to any disclaimer, the term of this patent is extended or adjusted under 35 U.S.C. 154(b) by 665 days.

(21) Appl. No.: 16/565,360

(22) Filed: Sep. 9, 2019

(65) Prior Publication Data

US 2021/0073064 A1 Mar. 11, 2021

(51) Int. Cl.
*G06F 11/07* (2006.01)
*G06F 16/93* (2019.01)
*G06F 40/30* (2020.01)

(52) U.S. Cl.
CPC ........ *G06F 11/079* (2013.01); *G06F 11/0769* (2013.01); *G06F 16/93* (2019.01); *G06F 40/30* (2020.01)

(58) Field of Classification Search
CPC ......... G06F 40/20; G06F 40/30; G06F 11/079
See application file for complete search history.

(56) References Cited

U.S. PATENT DOCUMENTS

| | | | |
|---|---|---|---|
| 7,191,364 B2 | 3/2007 | Hudson et al. | |
| 8,996,532 B2 | 3/2015 | Bhatt et al. | |
| 9,015,194 B2 | 4/2015 | Ziv et al. | |
| 9,275,338 B2* | 3/2016 | Noel | G06F 11/079 |
| 9,430,549 B2* | 8/2016 | Guo | G06F 16/2428 |
| 9,477,749 B2 | 10/2016 | Mathew et al. | |
| 9,792,347 B2* | 10/2017 | Guo | G06F 16/282 |
| 10,902,213 B2* | 1/2021 | Smith | G06Q 30/02 |
| 10,956,826 B2* | 3/2021 | Best | G06N 5/045 |
| 10,990,760 B1* | 4/2021 | Monnett | G06F 40/295 |

(Continued)

FOREIGN PATENT DOCUMENTS

| | | |
|---|---|---|
| CN | 107341068 A | 11/2017 |
| JP | 19-036414 A | 9/2008 |

*Primary Examiner* — Benjamin Smith
(74) *Attorney, Agent, or Firm* — Tutunjian & Bitetto, P.C.; John Kennel

(57) ABSTRACT

An ordered set of root cause analysis (RCA) document entry criteria is identified. RCA input segments are specified using unstructured natural language input, including at least: incident descriptive elements, a single problem statement, a set of why questions and answers, and a single cause categorization. A guided input sequence of the RCA input segments is performed interactively with a user. Quality indicators of content of user input entered during a respective RCA input segment are determined using a scoring algorithm, and the user is assisted with improving precision and consistency of the user input. Responsive to a threshold of consistent user input across the RCA input segments resulting in identification of a single cause categorization of an information technology (IT) problem, an RCA document is generated that identifies the single cause categorization of the new IT problem.

14 Claims, 6 Drawing Sheets

(56) References Cited

U.S. PATENT DOCUMENTS

| | | | |
|---|---|---|---|
| 11,187,446 B2* | 11/2021 | Brady | F25B 49/005 |
| 11,295,393 B1* | 4/2022 | Orphys | G06F 8/313 |
| 2007/0016831 A1* | 1/2007 | Gehman | G06F 11/079 |
| | | | 714/E11.131 |
| 2007/0112746 A1 | 5/2007 | Todhunter | |
| 2008/0114581 A1 | 5/2008 | Meir et al. | |
| 2009/0012970 A1* | 1/2009 | Ziv | G06F 16/35 |
| 2009/0313198 A1 | 12/2009 | Kudo et al. | |
| 2009/0327195 A1 | 12/2009 | Iscen | |
| 2010/0287361 A1 | 11/2010 | Grell et al. | |
| 2013/0262656 A1 | 10/2013 | Cao et al. | |
| 2014/0279837 A1* | 9/2014 | Guo | G06F 16/258 |
| | | | 707/603 |
| 2015/0347212 A1* | 12/2015 | Bartley | G06F 11/0709 |
| | | | 714/37 |
| 2016/0042002 A1* | 2/2016 | Gummaregula | G06F 16/93 |
| | | | 707/722 |
| 2016/0147589 A1* | 5/2016 | Noel | G06F 11/0751 |
| | | | 714/57 |
| 2016/0224647 A1* | 8/2016 | Guo | G06F 16/256 |
| 2017/0041815 A1 | 2/2017 | Fernandez Arboleda et al. | |
| 2017/0178038 A1* | 6/2017 | Guven | G06Q 30/016 |
| 2017/0330098 A1* | 11/2017 | Best | G06N 5/045 |
| 2018/0089567 A1 | 3/2018 | Marascu et al. | |
| 2018/0306476 A1* | 10/2018 | Brady | F25B 49/005 |
| 2018/0314573 A1* | 11/2018 | Chang | G06N 20/00 |
| 2020/0097548 A1* | 3/2020 | Smith | G06F 16/93 |
| 2020/0125992 A1* | 4/2020 | Agarwal | G06N 3/084 |
| 2020/0241861 A1* | 7/2020 | Zhang | G06F 8/70 |
| 2020/0258013 A1* | 8/2020 | Monnett | G06Q 10/06 |
| 2020/0342850 A1* | 10/2020 | Vishnoi | H04L 51/214 |
| 2021/0011832 A1 | 1/2021 | Togawa | G06F 17/40 |
| 2021/0014136 A1 | 1/2021 | Rath | G06N 20/20 |
| 2021/0374569 A1* | 12/2021 | Jezewski | G06N 20/00 |
| 2022/0075793 A1* | 3/2022 | Jezewski | G06F 40/247 |

* cited by examiner

US 11,526,391 B2

REAL-TIME COGNITIVE ROOT CAUSE ANALYSIS (CRCA) COMPUTING

BACKGROUND

The present invention relates to improvements in computer-based processing of information technology (IT) events. More particularly, the present invention relates to real-time cognitive root cause analysis (CRCA) computing.

Large information technology (IT) deployments include many different types of servers and databases that interoperate to provide an information technology solution for end users. These large IT deployments may experience service issues or system problems due to a variety of different types of hardware and/or software issues.

SUMMARY

A computer-implemented method of generating root cause analysis (RCA) documents for information technology (IT) problems includes identifying an ordered set of RCA document entry criteria, in accordance with an established computer-controlled RCA intake methodology, including RCA input segments specified using unstructured natural language input, the RCA input segments including at least: incident descriptive elements, a single problem statement, a set of why questions and answers, and a single cause categorization; and performing, interactively with a user using cognitive natural language processing (CNLP) across a guided input sequence of the RCA input segments that result in identification of a single cause categorization of a new IT problem, each of: determining, using a scoring algorithm that identifies weak keywords and weak causal connections, at least two quality indicators of content of unstructured user input entered during the respective RCA input segment by (i) applying natural language processing based (NLP-based) semantic analysis to the content of the unstructured user input and (ii) applying forward logical keyword connection analysis that enforces semantic consistency of the content of the unstructured user input across completed portions of the guided input sequence of the RCA input segments; and assisting, for any identified quality problems with the content of the unstructured user input entered during the respective RCA input segment based on the quality indicators, the user with improving precision and consistency of the content of the unstructured user input across the guided input sequence of the RCA input segments; and the computer-implemented method further including: generating, responsive to determining that a threshold of consistent unstructured user inputs across the completed portions of the guided input sequence of the RCA input segments facilitates identification of the single cause categorization, an RCA document that includes the content of the unstructured user input entered across the guided input sequence of the RCA input segments and that identifies the single cause categorization of the new IT problem.

A system that performs the computer-implemented method and a computer program product that causes a computer to perform the computer-implemented method are also described

DETAILED DESCRIPTION

Figure 1:
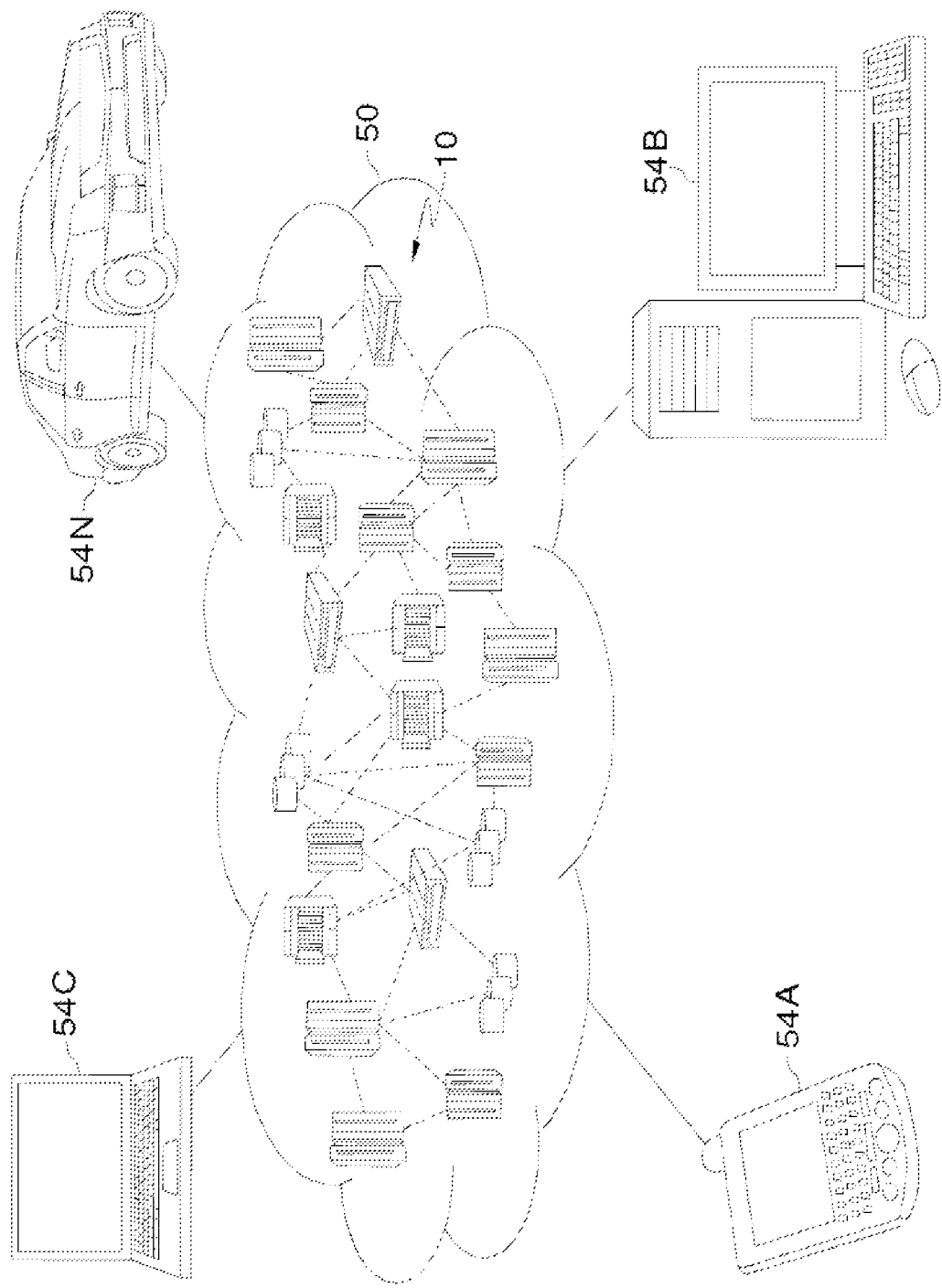
FIG. 1 depicts a cloud computing environment according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides real-time cognitive root cause analysis (CRCA) computing. The present technology solves multiple root cause identification problems by providing technology that includes a new form of computing device and computer processing that controls information technology (IT) trouble report intake/documentation and root cause analysis (RCA) within complex IT computing environments. The real-time CRCA computing described herein leverages real-time computing enhancements that intelligently evaluate and guide RCA information entry and IT event characterization and documentation, and thereby yield improved RCA resolution to improve IT systems/technology as a whole. As a result of the improved RCA facilitated by the technology described herein, many aspects of computer operation(s), computer integration, and computer services fulfillment are each improved. The technology described herein can be implemented within an Integrated Services Platform as part of a cloud-based computing platform and/or as an integrated cloud-based service provided as a part of a Watson high-speed computing implementation. The technology described herein may alternatively be implemented as a stand-alone solution.

Some terminology used in describing some embodiments of the present invention will now be explained. The term "established computer-controlled RCA intake methodology" as used herein represents a configured set of RCA input segments specified using unstructured natural language input that include at least: incident descriptive elements, a single problem statement, a set of why questions and answers, and a single cause categorization, in accordance with which computer-based analytics are methodically applied to data inputs of each RCA input segment to ensure consistency across the set of RCA input segments. The terms "advanced 5-whys" and "advanced 5-whys question/answer methodology" are used interchangeably herein as an example of an established computer-controlled RCA intake methodology that may be implemented according to the technology described herein, and refer collectively to an improved technique of guided questions and answers that are directed sequentially, using forward logical keyword connections, toward a single accurate categorization of an IT related issue, with the understanding that the directed sequence does not have to include five or more questions/answers and may include as few as three questions/answers, as appropriate for a given implementation. The phrase "forward logical keyword connections" and "forward logical keyword connection analysis" are used interchangeably herein and represent natural language processing based (NLP-based) semantic analysis of multiple distinct unstructured user inputs (e.g., sentences, phrases, etc.) that enforces and guides semantic consistency of the content of the unstructured user inputs across a sequence of RCA input segments. The phrases "guided RCA input sequence" and "guided input sequence," are used interchangeably herein and define an inter-related sequence of RCA input segments that include: (i) incident descriptive elements, (ii) an IT problem statement that is written with high quality, conciseness, correct tense, and proper applicability to an IT error/event, (iii) a set of IT problem-related questions that inquire about the IT problem statement and prior questions/answers, and (iv) a set of answers to each respective IT problem-related question that are processed using cognitive natural language processing (CNLP) as described herein to ensure that each input leads logically to the respective subsequent input in a directed manner toward a set of information that results in identification of (v) an accurate categorization of a root cause of the IT error/event. The guided input sequence implements principles of the "advanced 5-whys" as an example of the established computer-controlled RCA intake methodology, with the addition of the initial IT problem statement and the resulting accurate categorization/identification of a root cause of the IT error/event. The term "cognitive natural language processing" (CNLP) is hereby defined as computer-implemented analysis of and machine learning from each input of a guided input sequence, both individually and collectively within the context of information technology (IT) problem reporting. The CNLP ensures that each input is expressed in a form that facilitates computer evaluation of the content of the respective input as that content relates to computer identification of a root cause of the IT problem. The CNLP as utilized herein parses each input string (e.g., sentence, phrase, etc.), identifies terms and arrangements of terms, and applies identified terms and term arrangements according to their respective parts of the input string (e.g., subject, predicate, noun, verb tense, etc.) to the IT context associated with the guided input sequence. The input string is contextually interpreted as advancing an IT investigation. As a result, it should be understood that CNLP, as defined herein, represents computer-learning based upon significant contextual processing that is performed in addition to recognition of words performed by conventional natural language processing. The term "cognitive feedback" and "feedback" as used herein are defined as computer-based interactive/iterative inquiry with/to the user responsive to a determination from the CNLP that the input string includes an identified quality problem, such as either (i) not being properly formatted to guide the IT investigation or (ii) representing an inaccuracy or subjective statement that would mislead the IT investigation. The cognitive feedback guides/assists a user in correcting input strings that, absent the cognitive feedback, would not otherwise advance the IT investigation. The cognitive feedback as used herein results in improved computer-based RCA input sequences. The term "cognitive root cause analysis" (CRCA) is hereby defined as computer-implemented iterative real-time structured IT problem report input analysis that leverages CNLP and cognitive feedback to provide instantaneous user feedback at each step of user input. The CRCA ensures and improves the quality of each input in a logical, sequential, and inter-relational build-up of information about an IT error investigation. Each step of input is contingent upon and improves, in a forward logical manner, input of the previous step(s) of a guided input sequence, such that the computer guides the user input efficiently and effectively towards a quantifiable and properly categorized determination and documentation of a root cause of the IT error. As will be described in considerable detail herein, the real-time cognitive root cause analysis (CRCA) computing improves computer capabilities related to user guidance and input accuracy improvement of input sequences of RCA information related to IT issues.

The technology described herein addresses the analysis of root cause written (unstructured) text. Critical and/or non-critical issues are identified using distinct sets of rules to detect weaknesses in the root cause text form/format. The logical strength of the subsequent questions and answers is checked and confirmed through common word or synonym detection, which relies on NLP (natural language processing), and forward logical keyword connection analysis is applied to enforce semantic consistency of the content of the unstructured user input across the guided input sequence of the RCA input segments. As such, the analysis of forward logical keyword connections assesses and then composes and/or improves a new or written root cause analysis document, respectively.

Regarding the distinct sets of rules for different RCA input segments, each set of rules specifies a set of criteria against which (i) an answer and a subsequent question are evaluated, and (ii) an answer and a next answer are evaluated. These distinct sets of rules are applied, using a scoring algorithm, to identify at least two quality indicators of the content of an answer. The answer is classified in a straightforward order such that a path of user input is guided. The scoring algorithm is based on quantitative rules that represent quantitative aspects of the respective RCA input segment wording, and qualitative rules that represent qualitative aspects related to information technology. Once the answers are scored and one or more classifications are determined, the classification(s) of the answers are compared with previously-known-accurate RCAs to determine whether a known issue has occurred, or whether a new issue has occurred that is either similar to or deviates from the previously-known RCAs. As such, the technology described herein improves RCA document quality without searching for possible root causes, and instead verifies a causation flow based on previously-known RCA documents. Possible root causes are not suggested based upon other RCA documents or upon an indexed database of predetermined potential causes, but are instead verified based upon answers to questions of an established computer-controlled RCA intake methodology and based upon a set of rules that relate to both quantitative and qualitative aspects of an IT system.

The technology described herein operates by identifying an ordered set of root cause analysis (RCA) document entry criteria, in accordance with an established computer-controlled RCA intake methodology. The RCA input segments are specified using unstructured natural language input. The RCA input segments include at least: incident descriptive elements, a single problem statement, a set of why questions and answers, and a single cause categorization. A guided input sequence of the RCA input segments is performed interactively with a user using cognitive natural language processing (CNLP). The RCA input segments result in identification of a single cause categorization of a new information technology (IT) problem. Using a scoring algorithm that identifies weak keywords and weak causal connections, at least two quality indicators of content of unstructured user input entered during the respective RCA input segment are determined by (i) applying natural language processing based (NLP-based) semantic analysis to the content of the unstructured user input and (ii) applying forward logical keyword connection analysis that enforces semantic consistency of the content of the unstructured user input across completed portions of the guided input sequence of the RCA input segments. For any identified quality problems with the content of the unstructured user input entered during the respective RCA input segment based on the quality indicators, the user is assisted with improving precision and consistency of the content of the unstructured user input across the guided input sequence of the RCA input segments. An RCA document is generated responsive to determining that a threshold of consistent unstructured user inputs across the completed portions of the guided input sequence of the RCA input segments facilitates identification of the single cause categorization. The RCA document includes the content of the unstructured user input entered across the guided input sequence of the RCA input segments and identifies the single cause categorization of the new IT problem.

It should be noted that conception of the present subject matter resulted from recognition of certain limitations associated with conventional root cause analysis (RCA) in large and complex information technology (IT) deployments. For example, it was observed that certain technology service provision practices require a formal RCA to be generated for any service level agreement (SLA) that is missed. Additionally, it was observed that within a complex service provider environment, thousands of occurring issues must each be analyzed by applying one or more defined problem management procedure(s), and that this processing requires both root cause analysis to identify the problem and documentation of the root cause analysis into an RCA document. It was further observed that business services clients may request RCAs for a variety of other business conditions and problems. It was further observed that large and complex IT deployments may have fifteen to twenty thousand (15,000-20,000) reported service issues or system problems per year (hereinafter collectively "IT events"). It was determined from these observations that, because of volume of RCA reporting and the differences in RCA reporting requirements across business services clients, there is no conventional technical approach that allows automation of RCA input. It was further observed that conventional trouble reporting technologies allow users to enter certain information about IT events in an "unstructured" manner, and that the information entered is not verified in real-time or reviewed in real-time to ensure that the information entered advances a causal determination with respect to "why" the IT event has occurred. Additionally, because prior trouble reporting technologies utilize post entry review of causation (i.e., after entry of the information about the event without any form of consistency checks across informational components), the poor quality of intake information about the causation of the IT event and the time between the IT event and review for causation each contribute to inaccuracies of root cause analysis. For example, with conventional technologies, IT event reporting is highly subjective, and varies from user to user and over time. Because there is no control placed upon the foundational problem statement or following informational inquiry details resulting in varied problem statements that are not consistently written to ensure proper tense, grammar, and conciseness, the depth of investigation of the root cause of the IT event is limited. As a result of this form of foundational subjectivity, conventional RCA documentation often results in root causes of IT events either being not determined at all or being misclassified. As a further consequence, action item quality that results from conventional technologies is often low or misguided such that problems are not expediently corrected, which wastes productivity and resources across all IT system installations. Additionally, based upon the low quality of conventional RCA input, the inconsistency of identification with consequent failure to eliminate the true root cause, and the limited effectiveness of IT event investigations, approximately twenty percent (20%) or more of IT problems are repeated within IT environments. It was determined that this repeating tendency of IT events drives excessive cost for IT management systems.

Because of these several problems with conventional IT event root cause determination, it was determined that new technology that improves capabilities of computers during informational intake for trouble event reporting would not only improve the capabilities of the computer itself but would additionally have a practical application of improving IT management as a whole. Specifically, it was determined that improving computer capabilities to evaluate and iteratively improve accuracy and cohesiveness of information input during IT event reporting and to evaluate a root cause for accuracy in real-time during the IT event reporting would each improve the capabilities of the computer itself and would additionally have a practical application of improving IT management as a whole. The present subject matter improves root cause analysis in large and complex IT deployments by improving computer processing capabilities of each of (i) computer data acquisition, (ii) real-time iterative computer data analysis, and (iii) computer root cause determination, as described above and in more detail below. As such, improved computer processing of root cause determination(s) is obtained through use of the present technology.

The computing technology describe herein provides a comprehensive solution to establish objective criteria for key "end to end" segments of RCA documentation and processing, and measures the quality of RCA input while providing feedback to users that further improves RCA input quality at each segment. This processing includes the introduction of two types of discrete rules for the respective segments of RCA documentation and processing. The two types of discrete rules are partitioned into discrete sets of qualitative rules and discrete sets of quantitative rules that are assigned to each segment of RCA input processing. A rating algorithm applies these discrete rule sets at each input segment. The rating algorithm determines the respective quantitative and qualitative aspects of each individual input segment.

The main segments of a root cause analysis input/documentation series that are enhanced by the quantitative and qualitative rule sets and rating algorithm include: (1) a problem statement that is the foundation of the RCA investigation because it states the event/problem that is to be eradicated (never repeated); (2) a question/answer (Q/A) segment that is a series of questions and answers that dive sequentially deeper into the issue to get below the symptomatic surface; (3) a root cause determination that identifies the actual root-cause of the problem; (4) a cause classification in which causes are classified into common categories for both strategic/efficiency purposes and as a pathway to action planning; and (5) action planning that determines actions that can prevent the problem from recurring. As described above, different discrete quantitative and qualitative rule sets are applied to each of these segments of RCA input.

Further regarding the types of discrete rules that guide and control user input, the discrete sets of qualitative rules evaluate one or more quality or logical conditions of the RCA input segment. For example, the qualitative rules ensure that the user input is related to an aspect of the IT service based upon a classification of the problem statement sentence and validation against expected and/or known categories of IT-related inputs. A dictionary of terms to be avoided during input can be leveraged to ensure that the strength (relative quality) of the user input is not compromised by use of "weak" words. An example of a weak word is "probably." A user input that states that "X is probably the root cause" (where X is some aspect of IT-related technology) would be flagged because the term "probably" weakens the IT problem resolution of the RCA input.

In contrast to the discrete sets of qualitative rules, the discrete sets of quantitative rules measure one or more aspects of RCA user input that can be counted. For example, a length of a description in characters, or a number of nouns or verbs within a sentence can each be counted. Using the example of a number of nouns and verbs in a sentence, a set of discrete quantitative rules is utilized to enforce one (1) noun and one (1) verb per sentence of RCA user input to avoid mismatched pairings of subjects and predicates. This strict application of quantitative input control ensures that each sentence of user input is focused in a directed manner toward identification of the actual root cause of the IT issue. The discrete sets of quantitative rules are used to ensure that the RCA user input adheres to these types of input controls.

The technological computing approach operates by evaluating written and/or selected statements and identifying discrepancies in and among the statements. This technological solution provides recommended improvements at each segment, such that the "point of entry" authorship of an RCA document is improved. Further, the cognitive RCA (CRCA) quality reviewer function provided by the technology described herein gives the user the ability to get an objective rating of a single RCA or of multiple RCAs to appropriately focus rework efforts.

The input segments of the RCA listed above are evaluated with natural language processing (NLP) techniques against objective criteria developed by subject matter experts (SMEs) in the field of services delivery. Using the objective criteria, RCA statements are scored using a statement scoring algorithm. User feedback can be provided using a color-coded scheme (e.g., a red/amber/green scoring feedback).

The robust solution architecture is based upon a call-out schema that is used to implement the CRCA as a service to provide a full-quality IT solution that addresses the challenge of writing high-quality RCA documents. The call-out schema allows the cognitive RCA (CRCA) service to be accessed as a stand-alone service through a call-out mechanism. In this manner, RCA document quality may be reviewed through a call-out service. The content of the RCA document may be shared and accessed through a provided application programming interface (API), through which the data may be exchanged and the call-out service may provide a result of the quality analysis performed on the provided RCA document. By improving the written quality and ease-of-review of RCA documents, IT management is improved. The increased accuracy of RCA documents generated using the technology described herein further enables improved knowledge sharing of problems and solutions. This increased knowledge sharing prevents and decreases redundant efforts across multiple IT management teams.

The technology described herein implements and leverages five (5) distinct phases of distributed computer processing. It should be noted that, while the technological advancements described herein are focused primarily on the first two (2) of these distinct phases, the improvements provided by the technology described herein results in an overall improvement across all five (5) phases of the distributed computer processing. The five (5) distinct phases of distributed computer processing will now be described. First, a cognitive real-time RCA writing analyzer component operates as a point-of-entry writing quality analysis engine and writing assistant that improves RCA input quality at the user input interface. Second, a cognitive RCA (CRCA) quality reviewer component performs automated real-time review of RCAs based upon a known/configured set of best practices. Third, a cognitive RCA (CRCA) thematic insights component performs structured analysis of themes from a corpus of reference authenticated and computer-process guiding RCAs that allows the computer itself to drive a shorter time to identification and resolution of IT problems. Fourth, an RCA knowledge database provides an integrated platform for sharing of problem management lessons learned and the set of best practices. Fifth, an RCA operational dashboard component provides real-time analysis of problem management work in progress that improves the quality of the RCA document, and also manages the RCA cycle time and work in progress queue.

Regarding the five distinct phases of distributed computer processing described above, the first and second phases in priority order operate to improve the quality of the data in the future RCA data pool. These phases collectively thereby facilitate improved data mining, improved data ranking, and improved retrieval of previous problems/fixes. This improved data reusability through improved input quality further improves RCA processing over time to further expedite problem resolution. Additionally, linkages can be formed between related problems and solutions in the RCA data pool to allow the computer to further bridge creative solutions to problems that may be inter-related. Several additional benefits result from the improved RCA data.

The cognitive root cause analysis (CRCA) described herein interactively provides intelligent and instantaneous feedback to users that are responsible for IT investigations by identifying potential causes that the IT investigator may be unaware of or would not otherwise suspect as a root cause of a problem. Further, because of the instantaneous feedback to the RCA author (system user) regarding inaccurate input values, a quality summary is expediently prepared and delivered to the RCA author. The standardized and algorithmic rating scale of RCA elements that is applied at RCA input further raises the overall RCA document quality.

For example, the application of standardized algorithmic rating to RCA inputs results in foundational problem statements that are written with high-quality, conciseness, and correct tense. The problem statement is evaluated for tense, a technology/business/finance component, grammatical structure (including a verb, etc.), conciseness, a minimum number of words, non-existence of causal phrases (e.g., "due to"—which belongs in a question/answer section), and non-existence of weak words (e.g., "some," "probably," etc.).

This improvement in foundational problem statements results in improved processing of IT error investigations. The technology described herein forces investigations to complete a minimum of three questions within a sequence of potentially five or more questions that are directed to a resolution of the IT problem. As a result of this directed data input, the probability of identifying an accurate root cause is significantly increased. The increase in accurate root cause identification further leads to improved accuracy of root cause classification, with a contemporaneous improvement in the quality of action items issued to correct IT errors.

As introduced above, and further with respect to the question/answer session, the technology described herein leverages an established computer-controlled RCA intake methodology or advanced 5-whys series of inquiries that include knowledge of the information technology domain within which the inquiries are applied. The established computer-controlled RCA intake methodology or advanced 5-whys question/answer methodology use natural language processing based (NLP-based) analysis of input terms and structure, and force a forward logical keyword connection/linkage of each question and answer to enforce semantic consistency of the content of the input across a guided input sequence of the RCA input segments. Specifically, rules/criteria are applied to select and assess a next question with a next answer based upon the foundational problem statement and any previous questions/answers. Further, each successive/next answer is assessed in the context of previous answers. By ensuring that an answer provided by the user extends and enhances information already gathered, a directed and precise determination of causation results. The integrated continuity and linkage throughout an IT investigation that is provided by the technology described herein drives a symptomatic issue to a root cause with improved efficiency and accuracy over conventional approaches to root cause analysis.

To further the set of examples regarding RCA data entry, an author (user) within a real-time writing analyzer is provided with automatically selected and pre-populated recommendations that are derived from the RCA knowledge pool and that guide the IT investigation. By use of writing feedback based upon natural language processing, usage of the word "why" is enforced to ensure a disciplined and structured writing approach. Further, a minimum input length (e.g., 3 words or more) is enforced to facilitate meaning and context that may be leveraged by the CRCA computer to improve next-question pre-population. Usage of the word "because" is additionally emphasized to import discipline into the writing approach. Use of past tense written patterns is enforced because RCAs are, by definition, performed "after" events have already occurred. Input phrase length is governed because it has been determined that long and rambling answers typically do not include any real answer to the preceding question. Warnings are issued within all RCA input segments to warn against the usage of weak words.

Regarding the cause classification segment, the CRCA technology described herein ensures that each resulting cause classification is assigned to a root cause that is linked and classified within an acceptable library of causes. Cause classification accuracy improves causal comparison across a portfolio of RCA documents, and improves optimal usage of resources that are invoked to resolve IT errors.

Regarding cognitive computer learning and cognitive action determination, the technology described herein uses a set of historic records for training. The set of historic records are written to the rigorous standards of input expected of users during deployed usage of the CRCA system. Actions are taken from the repository for pattern recognition and best practice training, starting with the last answer (root-cause). Then, advanced natural language processing techniques using semantic analysis are applied to the corpus of data. Suggested actions are then selected, deselected, and/or augmented with custom actions, resulting in a trained CRCA system that accepts new IT RCA input that is formatted properly and directed toward root cause identification of new IT errors.

Regarding the algorithmic scoring of RCA input quality, the CRCA system classifies defects within written input as either errors or warnings, and issues respectively error or warning statements. In the case of an error, the user (RCA author) is prompted to fix the issue or the user is not permitted to move forward in the writing of the RCA document. In the less serious case of a warning, feedback is given to the user, though the user may be allowed to move forward in the RCA process. The quantity of errors and warnings are added to determine a red/amber/green (RAG) scaling of the RCA author's input. In the RAG approach, items with zero (0) errors and warnings (E+W) combined are designated green; those with one (1) errors and warnings (E+W) combined are designated amber; while those with two (2) errors and warnings (E+W) combined are designated red. This or a similar color-coded approach to feedback further assists and directs user input that is meaningful within the context of the particular IT error in issue.

Regarding certain available technological underpinnings that may be utilized and leveraged to implement the CRCA system, representational state transfer (REST) application programming interfaces (APIs) may be utilized. Further, web application building software, computer software writing frameworks, a natural language tool kit (NLTK), a natural language understanding/natural language analyzer (NLC/NLA), and characteristics or qualities specified within published IT Management practices may each be utilized, as appropriate for a given implementation.

As introduced above, the two types of discrete rules are partitioned into discrete sets of qualitative rules and discrete sets of quantitative rules that are assigned to each segment of RCA input processing. Warnings regarding RCA input and critical issues regarding RCA input are each categorized along with the qualitative and quantitative type of the respective rules The following Tables map an example root cause analysis (RCA) rule set for guided RCA input sequence processing across different RCA input segments. The example RCA rule set described below includes different RCA rule subsets that are usable to process the different RCA inputs segments that are used to create an RCA document. Each of the RCA rule subsets includes both qualitative and quantitative rules that are applicable to each of the respective RCA user input segments. It should be understood that the following example RCA rule set provides a foundation for development of rule sets usable to process RCA input. It should further be understood that different rules, different partitioning of RCA input segments, and different RCA rule subsets may each be utilized, as appropriate for a given implementation.

In view of size limitations of drawing figures and the details presented with respect to the various example rules below, the Tables below are presented and described according to an ordered sequence of processing of RCA user input. As a result, the ordered sequence of presentation of the Tables below also contemporaneously illustrates a process flow of RCA user input in lieu of a graphical representation of this particular aspect of RCA user input process flow, again because of size limitations of drawing figures. Abbreviations for qualitative (e.g., quaLitative=L) and quantitative (quaNtitative=N) are utilized to assist with visual distinction of the respective terms within the "Type" columns of the respective tables.

It should be noted that processing of RCA input generates a warning if any defined warning-level or critical-level rule is violated. Feedback is provided to the user with the warning along with suggested changes to the input to both alert the user regarding proper input formatting according to the respective rules and to assist the user with improving the precision and consistency of content of user input using RCA segment-specific feedback. Processing may iterate at each respective input segment until the user formats the RCA input according to the respective rules. Proper formatting of the RCA input at each segment of the guided input sequence ensures that natural language processing and computer analysis are expediently performed to improve accuracy of RCA issue categorization.

The following Table 1 lists example incident descriptive element rules. The incident descriptive rules control the first segment of the guided input sequence, and proper formatting of the unstructured input is enforced using the respective rules.

TABLE 1

Incident Descriptive Element Rules

| RULE | TYPE | LEVEL |
| --- | --- | --- |
| Is length within limits? | Quantitative (N) | Warning |
| Is using sentences within the limit? | Quantitative (N) | Warning |

The length limits and sentence limits are established as appropriate for the given implementation, and may establish both minimum/maximum length and element criteria. Further, different length limits and/or sentence limits can be established for different RCA input segments, as also appropriate for the given implementation.

For example, length limits are specified to enforce input length to a minimum of ten (10) characters and to a maximum of six hundred to two thousand (600-2000) characters. Additionally, sentence limits can be specified to ensure that an established number of sentences, such as a maximum of three (3) sentences or ten (10) sentences, are input for a given input segment by the user. Further, a character limit per sentence can be established, such as a character limit per sentence of three hundred (300) characters. In this way, configuration of the input rules are adapted to the particular IT system and adjusted over time to ensure conciseness in RCA input and to assist with cognitive computer recognition of the input using natural language processing. Again, if an error in RCA input is identified, feedback processing with a warning issued to the user can iterate until the RCA input satisfies the configured rules. RCA input processing can then continue to the next segment of RCA input. Once the RCA input is validated to be compliant with the rules of the current RCA input segment, processing continues to the next RCA input segment.

The following Table 2 lists example problem statement rules for critical issues and for warning issues. The problem statement rules control the second segment of the guided input sequence, and proper formatting of the unstructured input is enforced using the respective rules.

TABLE 2

Problem Statement Rules

| RULE | TYPE | LEVEL |
| --- | --- | --- |
| Related to our service? | Qualitative (L) | Critical |
| Can be categorized into problem categories? | Qualitative (L) | Critical |
| Contains problem statement/expressions? | Qualitative (L) | Critical |
| Contains a statement with verb? | Quantitative (N) | Critical |
| Is clear of causal words? | Qualitative (L) | Critical |
| Is clear of weak words/phrases? | Qualitative (L) | Warning |
| Is written in past tense? | Qualitative (L) | Warning |
| Has a valid sentence structure? | Qualitative (L) | Warning |
| Is length within limits? | Quantitative (N) | Warning |

The problem statement entered by the user is analyzed using natural language processing. Using the rules specified in Table 2, the problem statement is analyzed to ensure that the input text of the problem statement refers to an information technology or other business related issue, as appropriate for the given domain within which the present technology is implemented. A companion list of acceptable/appropriate terms is utilized to validate the input. The rules collectively ensure that the problem statement can be classified into one (and exactly one) problem category of a set problem categories with considerably higher confidence than any other problem category in the set of problem categories. This early assurance of proper categorization facilitates expedient identification of IT-related issues. Problem categories are defined as appropriate for a given implementation to reflect the issue the input text describes (e.g., service failure, unspecified hardware issue, specified hardware issue, etc.). These rules further ensure that the problem statement contains one or more expressions that actually describe a problem situation (e.g., "something failed," "unable to access server," etc.). Again, a list of acceptable/appropriate terms is utilized to validate the input. The problem statement is further analyzed using natural language processing to ensure that it is in a proper grammatical format (e.g., includes a subject, includes a verb, etc.). The problem statement is further analyzed to ensure that no weak words or words that express uncertainty (e.g., "maybe," "should," "could," etc.) are present because these types of terms make the problem statement uncertain. The causal relation that is to be determined is distinct from a plain statement of the problem, therefore the rules further ensure that the problem statement is free of expressions that describe a causal relation (e.g., "due to," "caused by," etc.). The rules further ensure that the problem statement is written in past tense because RCAs are describing an incident that happened in the past. The rules additionally ensure that the problem statement is concise in terms of words and sentences, and is formatted in complete sentences with subject/action/object tuples. If no critical or warning issues are identified in the RCA input, the processing provides user feedback that no issue has been identified in the RCA input. Otherwise, feedback on any of the critical issues or warning issues is provided, and processing iterates to allow the user to correct the RCA input. With the RCA input validated and found to be compliant with the rules of the current RCA input segment, processing continues to the next RCA input segment.

The following Table 3 lists example question rules. The question rules control the third segment of the guided input sequence, and proper formatting of the unstructured input is enforced using the respective rules.

TABLE 3

Question Rules

| RULE | TYPE | LEVEL |
| --- | --- | --- |
| Can sufficient common words be detected by resolving synonyms and abbreviations? | Qualitative (L) | Critical |
| Does it start with "Why"? | Quantitative (N) | Critical |
| Links to previous Answer and Problem Statement through common words? | Qualitative (L) | Critical |
| Links to previous Question through common words, taking into account abbreviations and synonyms? | Qualitative (L) | Critical |
| Is length within limits? | Quantitative (N) | Warning |

As introduced above, the "5-whys" approach to the question and answer segments represents one example of an established computer-controlled RCA intake methodology, and preferably includes at least three (3) iterations of questions and answers and is not limited to five (5) such pairings. Regarding sufficiency of common words, the question rules can resolve any synonyms or abbreviations, and then further ensure that a configured number of matching words (e.g., least two (2) matching words, etc.) are identified within each of a given question and problem statement. The question rules further ensure that each question starts with the word "why" according to the established computer-controlled RCA intake methodology, and are termed 5-whys process rules for ease of reference herein. The question rules further enforce a formal connection between a subsequent question and answer. This connection can be defined as a presence of common words among the different RCA inputs to ensure that the RCA text is more readable and that logical consistency is enforced within the unstructured input written across the different segments of RCA input. A predefined list of synonyms and abbreviations is used to enhance linkage via common words. The question rules enforce these links to prior and subsequent RCA input. If no critical or warning issues are identified in the RCA input, the processing provides user feedback that no issue has been identified in the RCA input. Otherwise, feedback on any of the critical issues or warning issues is provided, and processing iterates to allow the user to correct the RCA input. With the RCA input validated and found to be compliant with the rules of the current RCA input segment, processing continues to the next RCA input segment.

The following Table 4 lists example answer rules. The answer rules control the fourth segment of the guided input sequence, and proper formatting of the unstructured input may be enforced using the respective rules.

TABLE 4

Answer Rules

| RULE | TYPE | LEVEL |
| --- | --- | --- |
| Is using the term "Because"? | Quantitative (N) | Critical |
| Is extending the information content? | Qualitative (L) | Critical |
| Links to previous Question through common words, taking into account abbreviations and synonyms? | Qualitative (L) | Critical |
| Can sufficient words be detected by resolving synonyms and abbreviations? | Qualitative (L) | Critical |
| Contains a statement with verb? | Quantitative (N) | Critical |
| Is written in past tense? | Qualitative (L) | Warning |
| Has a valid sentence structure, only single sentences? | Quantitative (N) | Warning |
| Is clear of weak words/phrases? | Qualitative (L) | Warning |
| Is on the correct Decision Path? | Qualitative (L) | Warning |

To further emphasize the description above, while the present technology is built upon and leverages an established computer-controlled RCA intake methodology, by way of example a "5-whys" approach, the question and answer segments preferably include at least three (3) iterations of questions and answers and are not limited to five (5) such pairings. The answer rules ensure that an answer provided contains the term "because" to enforce consistent formatting of user input. This rule can be configured with an expected value of one (1) or more, as appropriate for the given implementation. It should be noted that the presence of the term "because" in an answer is considered a key indicator of a good quality Answer. The answer rules ensure that each step of the established computer-controlled RCA intake processing sequence adds some new information to the RCA issue resolution. The answer rules ensure that there is a formal connection between a subsequent question and answer. This connection is defined as a presence of common words among the respective questions/answers to again ensure that the RCA input text is more readable and to enforce logical consistency in the unstructured written input across the different segments of RCA input. Again, a predefined list of synonyms and abbreviations is used to enhance linkage via common words. The answer rules also enforce these links to prior and subsequent RCA input, and ensure that the answer is a properly-formatted statement in both grammar and sentence structure. The answer rules also ensure that answers are written in past tense (e.g., verbs are written in past tense) because, as with the problem statement, RCAs are describing an incident that happened in the past. The answer rules also ensure that answers are written as complete sentences with subject/action/object tuples, and avoid terms that result in the answer statement being uncertain (e.g., do not have words like "some" or "maybe," etc.). The answer rules also ensure that answers are concise, and preferably include only one (1) sentence. The answer rules further ensure that answers follow a known conceptual path as they reach the root cause. A natural language classifier service iteratively compares the problem category with the input text to determine if the answer provided is plausible given the problem category of the previous answer. Problem categories can be defined as appropriate to reflect the issue the answer describes (e.g., a service failure, an unspecified hardware issue, a specified hardware issue, etc.). If no critical or warning issues are identified in the RCA input, the processing provides user feedback that no issue has been identified in the RCA input. Otherwise, feedback on any of the critical issues or warning issues is provided, and processing iterates to allow the user to correct the RCA input. With the RCA input validated and found to be compliant with the rules of the current RCA input segment, processing continues to the next RCA input segment.

The following Table 5 lists example supplemental rules applied to the "last" answer of the set of answers. The last answer rules control the fifth segment of the guided input sequence, and proper formatting of the unstructured input is enforced using the respective rules.

TABLE 5

Last Answer Rules

| RULE | TYPE | LEVEL |
|---|---|---|
| Clear of problem resolution terms? | Qualitative (L) | Critical |
| Belongs to a valid problem category? | Qualitative (L) | Critical |
| Is Cause Category classification clear? | Qualitative (L) | Critical |
| Not concluding to "unknown"? | Qualitative (L) | Warning |
| Sentiment is not positive: Not a resolution? | Qualitative (L) | Warning |

The last answer rules collectively ensure that the last answer entered does not presuppose a resolution because such a presupposition may exclude or otherwise foreclose an accurate categorization of an IT issue through potential misdirection. Further, the last answer processing ensures that the last answer excludes terms that would otherwise express that the root cause is left to be unknown or undetermined. The programmatic processing is designed to make certain that the last answer is free of terms that describe the problem resolution, and instead provides a concise answer from which a valid problem category may be identified. For example, the last answer rules ensure that the last answer entered belongs to a valid problem category (e.g., a service failure, an overload, or a timeout issue). A natural language classifier service is used to identify a valid problem category of the last answer input text, and further check to determine that the last answer input text is describing a problem category without predisposition or presupposition of a resolution. Problem categories can be defined for any given implementation to reflect the issue the answer describes (e.g., a service failure, an unspecified hardware issue, a specified hardware issue, etc.). The last answer is iteratively processed using cognitive feedback to the user to ensure that the last answer is capable of being classified into a single IT cause category with a considerably higher confidence/probability than any other IT cause category. It should be noted that a variety of industry recognized classifications of cause categories exist, and that any one of multiple industry recognized classifications of cause categories may be utilized for describing IT service issues, as appropriate for a given implementation. One example of an industry recognized classification of cause categories is information technology infrastructure library (ITIL). ITIL includes one such set of industry standard categories for describing IT service issues. If no critical or warning issues are identified in the RCA input, the processing provides user feedback that no issue has been identified in the RCA input. Otherwise, feedback on any of the critical issues or warning issues is provided, and processing iterates to allow the user to correct the RCA input. With the RCA input validated and found to be compliant with the rules of the current RCA input segment, processing continues to the next RCA input segment.

The following Table 6 lists example cause code classification rules. The cause code classification rules control the sixth segment of the guided input sequence, and proper formatting of the unstructured input is enforced using the respective rules.

TABLE 6

Cause Code Classification Rules

| RULE | TYPE | LEVEL |
|---|---|---|
| Root Cause is in accord with the Last Answer? | Qualitative (L) | Warning |
| Cause Category is in accord with the Last Answer? | Qualitative (L) | Warning |

At this last segment of input processing, the computer guided input sequence provides an output selection from a set of drop-down lists that represent the root cause that was derived from the last answer. The output specifies the identified RCA root cause, the identified RCA cause category, and any RCA cause subcategory that may exist to further specify categorization of the IT issue. The user is provided with feedback to correct any identified inconsistencies. The user may select "Change Management" from the respective drop-down list if appropriate. If no warning issues are identified in the RCA input, the processing provides user feedback that no issue has been identified in the RCA input. Otherwise, feedback on any of the warning issues is provided, and processing iterates to allow the user to correct the RCA input. For example, if user input through the guided input sequence resulted in an RCA root cause derived from the guided input sequence and last answer results in "Product," but "Process" appears to the real-time CRCA computing to be a more accurate root cause based upon system knowledge of actual problem causation, then feedback to the user is provided to consider whether "Process" is more accurate that "Product." The user may select "Process" from the respective drop-down list if appropriate. As another example, if the RCA root cause category derived from the guided input sequence and last answer results in "Software Error," but "Change Management" appears to the real-time CRCA computing to be a more accurate cause category, then feedback to the user is provided to consider whether "Change Management" is more accurate than "Software Error."

With the user's change(s) and/or confirmation, a completed RCA document that results from the guided input sequence is created and issued to an IT department for correction of the IT issue. With the more accurate input and root cause categorization provided by the technology described herein, IT departments can more confidently and expediently correct actual root causes. As such, the technology described herein improves computer capabilities at detection and correction of inaccurate user inputs and user input sequences, and improves IT systems as a whole by facilitating accurate IT issue determination and resolution within IT domains.

The real-time computer-improved root cause analysis described herein may be performed in real time to allow prompt determination of root causes of IT events. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Additionally, the present technology may be implemented within or as part of a cloud computing environment (e.g., for root cause analytics), or may be implemented as a customized environment-specific solution. As such, examples of implementations for both environments are included herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
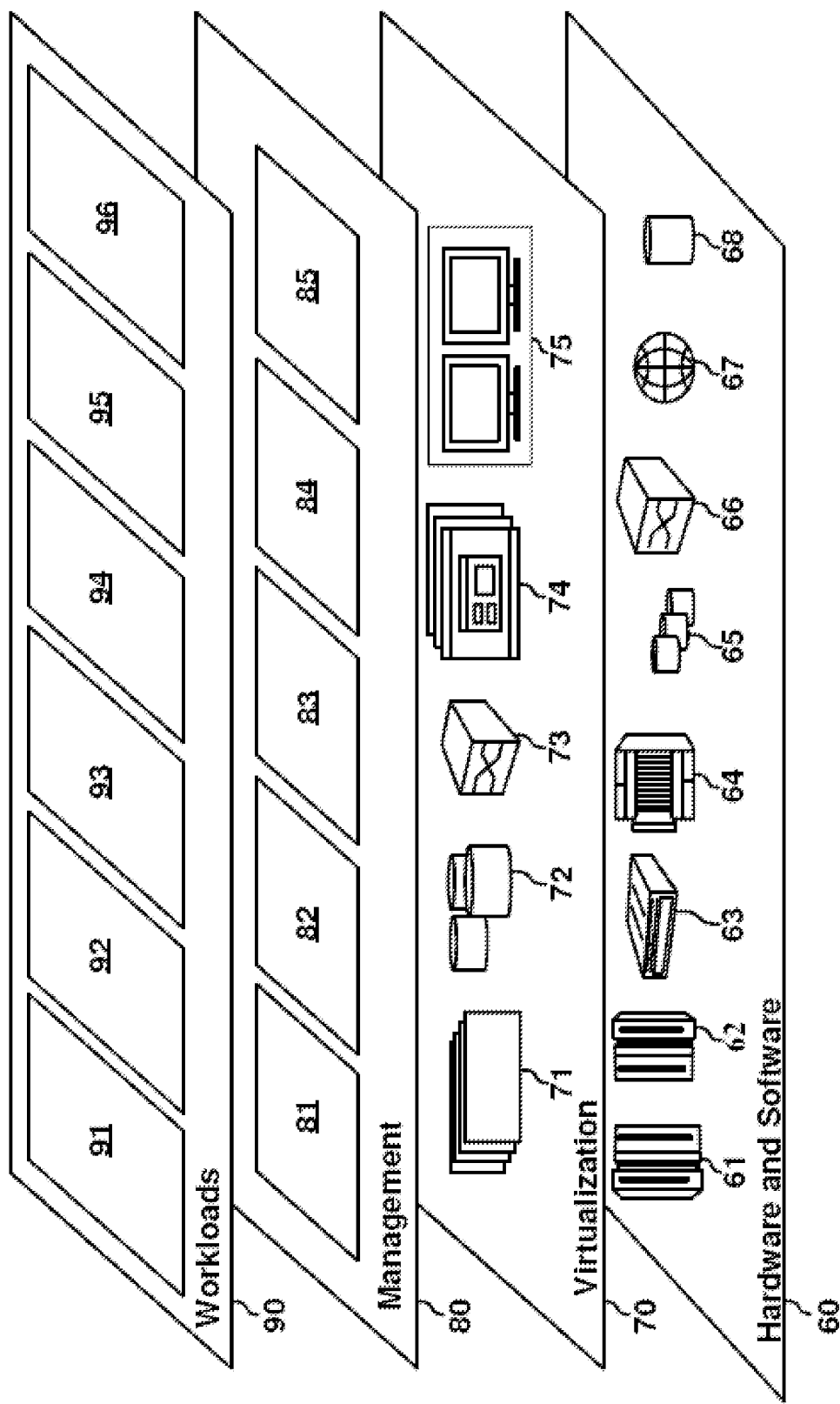
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and real-time cognitive root cause analysis (CRCA) computing 96.

Figure 3:
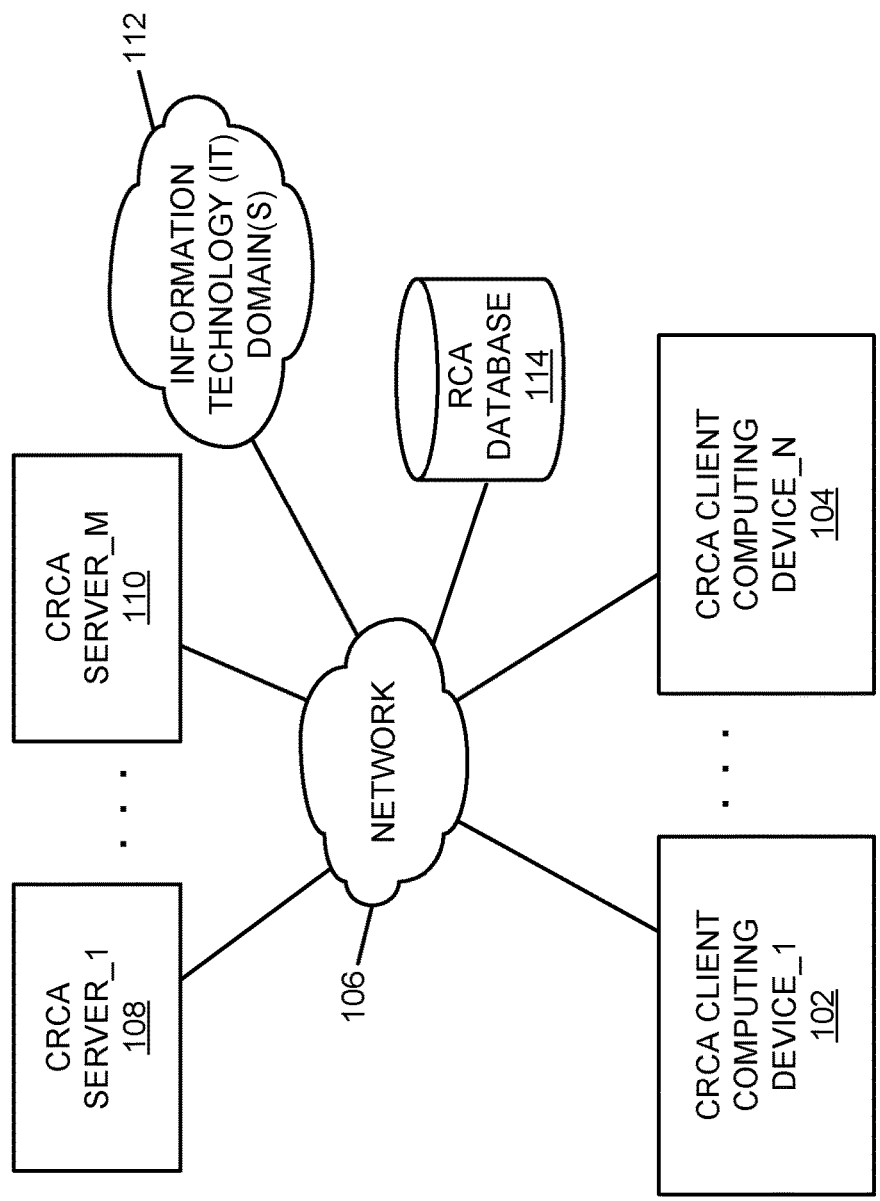
FIG. 3 is a block diagram of an example of an implementation of a system for real-time cognitive root cause analysis (CRCA) computing according to an embodiment of the present subject matter.

FIG. 3 is a block diagram of an example of an implementation of a system 100 for real-time cognitive root cause analysis (CRCA) computing. A cognitive root cause analysis (CRCA) client computing device_1 102 through a CRCA client computing device_N 104 communicate via a network 106 with several other devices. The other devices include a cognitive root cause analysis (CRCA) server_1 108 through a CRCA server_M 110 that instruct users of the CRCA client computing device_1 102 through the CRCA client computing device_N 104 regarding entry of guided RCA input sequences that result in creation of root cause analysis (RCA) documents regarding IT issues and/or IT problems associated with one or more information technology (IT) domain(s) 112. The RCA documents may be stored within a root cause analysis (RCA) database 114. The RCA database 114 can additionally store RCA training data, RCA entry rules, RCA categories for use in characterizing RCAs, and other information as described herein.

As will be described in more detail below in association with FIG. 4 through FIG. 6, any of the CRCA computing device_1 102 through a CRCA computing device_N 104 and the CRCA server_1 108 through the CRCA server_M 110 provides one or more aspects of automated RCA document entry guidance and control processing that provides for directed identification and documentation of actual root causes associated with the IT issues and/or IT problems. The automated RCA document entry guidance and control processing is based upon natural language processing of user inputs, with feedback applied according to the RCA entry rules that preserves the integrity and cohesiveness of entered RCA documents. The distribution of computer processing is assigned among the respective devices as appropriate for the given implementation. For example, cognitive RCA may be partitioned between a CRCA web service that is provided by the CRCA server_1 108 through the CRCA server_M 110 to a web browser interface of the CRCA client computing device_1 102 through the CRCA client computing device_N 104. One or more of the CRCA server_1 108 through the CRCA server_M 110 may operate as a web hosting device. Additionally or alternatively, a CRCA back-end service may be implemented by one or more of the CRCA server_1 108 through the CRCA server_M 110 to off-load performance of the natural language processing related (NLP-related) tasks. In such an implementation, the CRCA back-end service may implement a natural language tool kit (NLTK) for semantic analysis of RCA input segments, may implement a natural language classifier, and may implement a natural language understanding application programming interface (API). As such, the present technology may be implemented at a user computing device or server device level, or by a combination of such devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The RCA database 114 may include a relational database, an object database, or any other storage type of device. As such, the RCA database 114 may be implemented as appropriate for a given implementation.

Figure 4:
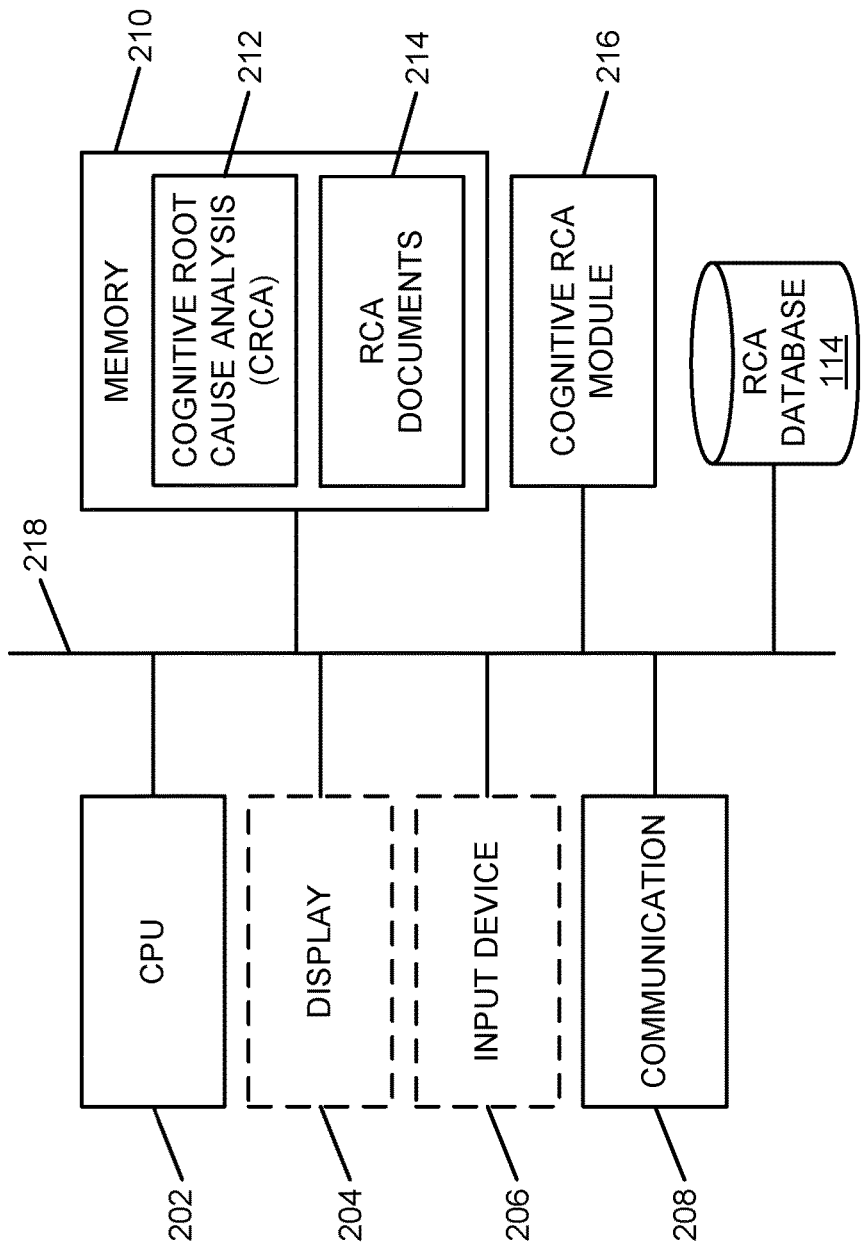
FIG. 4 is a block diagram of an example of an implementation of a core processing module capable of performing real-time cognitive root cause analysis (CRCA) computing according to an embodiment of the present subject matter.

FIG. 4 is a block diagram of an example of an implementation of a core processing module 200 capable of performing real-time cognitive root cause analysis (CRCA) computing. The core processing module 200 may be associated with any or all of the CRCA computing device_1 102 through the CRCA computing device_N 104 or with the CRCA server_1 108 through the CRCA server_M 110, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

Further, the core processing module 200 may provide different and complementary processing of real-time cognitive root cause analysis (CRCA) computing in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 are illustrated with a dashed-line representation within FIG. 4 to indicate that they may be optional components for the core processing module 200 for certain implementations/devices, or may be located remotely from the respective devices and hosted by another computing device that is in communication with the respective devices, such as for the CRCA server_1 108 through the CRCA server_M 110. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a cognitive root cause analysis (CRCA) storage area 212 that stores natural language processing (NLP) information, training information, RCA document entry rules, and other information used to guide and control root cause analysis inputs and root cause analysis (RCA) documents in association with the core processing module 200. As will be described in more detail below, information stored within the CRCA storage area 212 is used to improve computer-based processing for consistency of collection of RCA documents and identification of root causes of IT issues.

The memory 210 also includes an RCA documents storage area 214. The RCA documents storage area 214 stores intermediate information captured during entry of different RCA segments of a guided RCA input sequence during creation of an RCA document. The RCA documents storage area 214 further stores completed and validated RCA documents that may be utilized for additional guided RCA input sequences.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A cognitive RCA module 216 is also illustrated. The cognitive RCA module 216 provides for and controls input processing during root cause analysis document entry for the core processing module 200, as described above and in more detail below. The cognitive RCA module 216 implements the automated real-time cognitive root cause analysis (CRCA) computing of the core processing module 200.

It should also be noted that the cognitive RCA module 216 may form a portion of other circuitry described without departure from the scope of the present subject matter. The cognitive RCA module 216 may form a portion of an interrupt service routine (ISR), a portion of an operating system, or a portion of an application without departure from the scope of the present subject matter. The cognitive RCA module 216 may also include an embedded device with circuitry designed specifically to perform the processing described herein as appropriate for a given implementation.

The RCA database 114 is also shown associated with the core processing module 200 within FIG. 4 to show that the RCA database 114 may be operatively coupled to the core processing module 200 without requiring external connectivity, such as via the network 106.

The CPU 202, the display 204, the input device 206, the communication module 208, the memory 210, the cognitive RCA module 216, and the RCA database 114 are interconnected via an interconnection 218. The interconnection 218 may include a system bus, a network, or any other interconnection capable of providing the respective components with suitable interconnection for the respective purpose.

Though the different modules illustrated within FIG. 4 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the RCA database 114 is illustrated as a separate component for purposes of example, the information stored within the RCA database 114 may also/alternatively be stored within the memory 210 without departure from the scope of the present subject matter. Accordingly, the core processing module 200 may take many forms and may be associated with many platforms.

Figure 5:
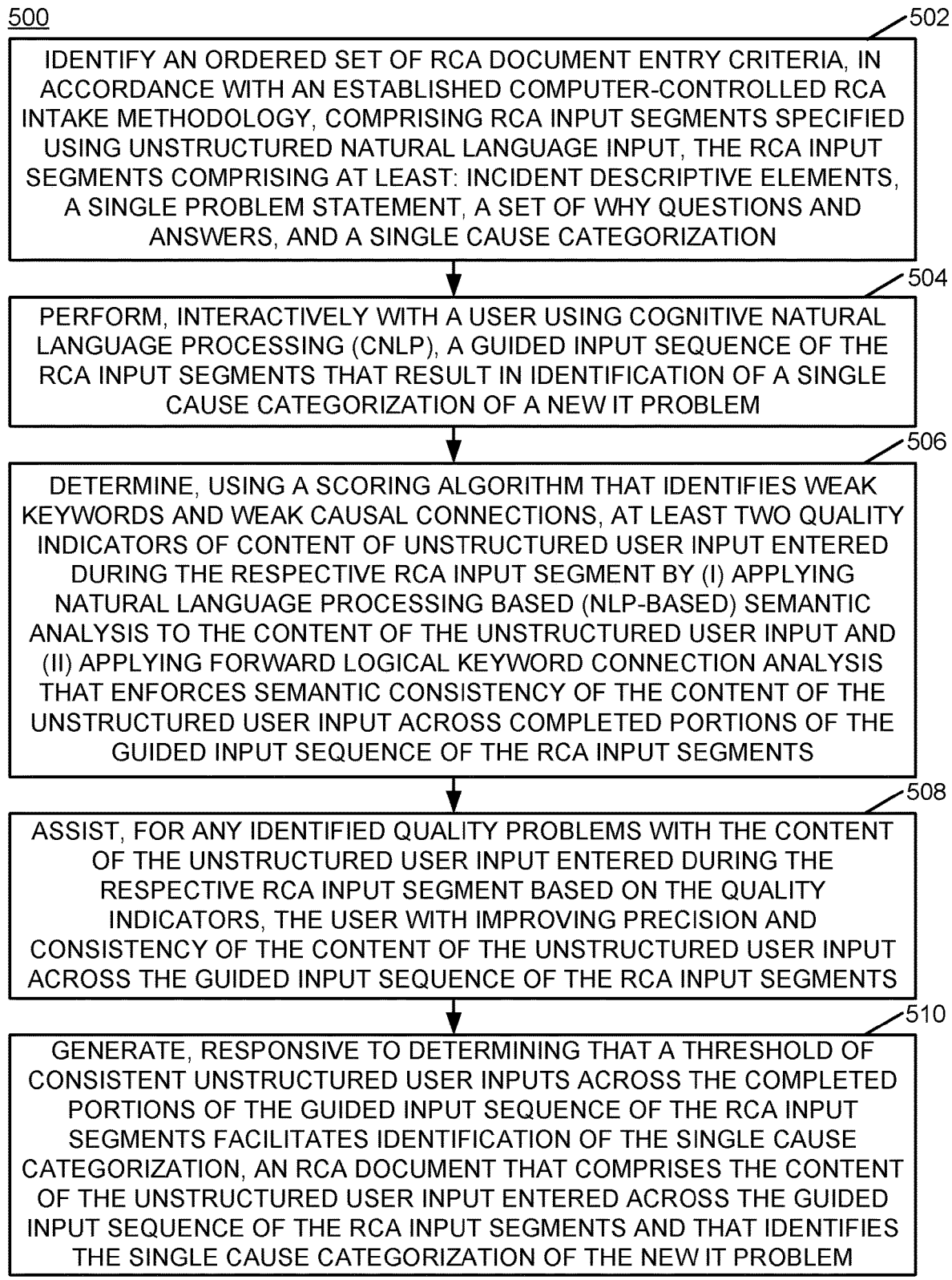
FIG. 5 is a flow chart of an example of an implementation of a process for real-time cognitive root cause analysis (CRCA) computing according to an embodiment of the present subject matter.
Figure 6:
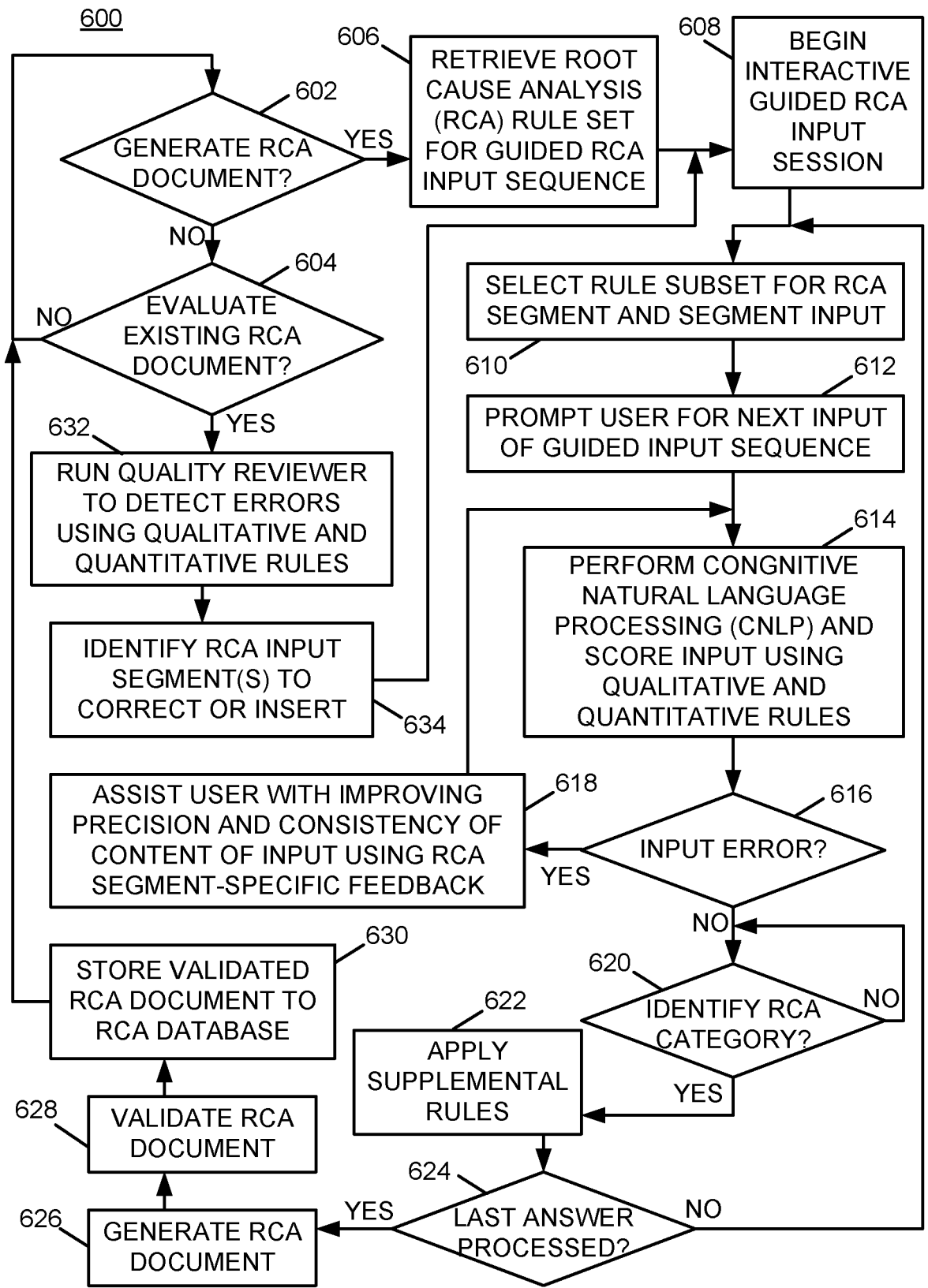
FIG. 6 is a flow chart of an example of an implementation of an alternative process for real-time cognitive root cause analysis (CRCA) computing according to an embodiment of the present subject matter.

FIG. 5 through FIG. 6 described below represent example processes that are executed by devices, such as the core processing module 200, to perform the real-time cognitive root cause analysis (CRCA) computing associated with the present subject matter. Many other variations on the example processes are possible and all are considered within the scope of the present subject matter. The example processes may be performed by modules, such as the cognitive RCA module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 5 is a flow chart of an example of an implementation of a process 500 for real-time cognitive root cause analysis (CRCA) computing. The process 500 represents a computer-implemented method of performing the computer-based cognitive RCA documentation and processing described herein. At block 502, the process 500 identifies an ordered set of RCA document entry criteria, in accordance with an established computer-controlled RCA intake methodology, comprising RCA input segments specified using unstructured natural language input, the RCA input segments comprising at least: incident descriptive elements, a single problem statement, a set of why questions and answers, and a single cause categorization. At block 504, the process 500 performs, interactively with a user using cognitive natural language processing (CNLP), a guided input sequence of the RCA input segments that result in identification of a single cause categorization of a new IT problem. At block 506, the process 500 determines, using a scoring algorithm that identifies weak keywords and weak causal connections, at least two quality indicators of content of unstructured user input entered during the respective RCA input segment by (i) applying natural language processing based (NLP-based) semantic analysis to the content of the unstructured user input and (ii) applying forward logical keyword connection analysis that enforces semantic consistency of the content of the unstructured user input across completed portions of the guided input sequence of the RCA input segments. At block 508, the process 500 assists, for any identified quality problems with the content of the unstructured user input entered during the respective RCA input segment based on the quality indicators, the user with improving precision and consistency of the content of the unstructured user input across the guided input sequence of the RCA input segments. At block 510, the process 500 generates, responsive to determining that a threshold of consistent unstructured user inputs across the completed portions of the guided input sequence of the RCA input segments facilitates identification of the single cause categorization, an RCA document that comprises the content of the unstructured user input entered across the guided input sequence of the RCA input segments and that identifies the single cause categorization of the new IT problem.

FIG. 6 is a flow chart of an example of an implementation of an alternative process 600 for real-time cognitive root cause analysis (CRCA) computing. The process 600 also represents an alternative computer-implemented method of performing the computer-based cognitive RCA processing described herein. It should be noted that the process 600 is used to generate an RCA document and to evaluate existing RCA documents. As such, both execution paths are shown and described in more detail below.

At decision point 602, the process 600 makes a determination as to whether a request to generate an RCA document has been detected. In response to determining at decision point 602 that a request to generate an RCA document has not been detected, the process 600 makes a determination at decision point 604 as to whether a request to evaluate the quality of an existing RCA document has been detected. In response to determining at decision point 604 that a request to evaluate the quality of an existing RCA document has not been detected, the process 600 returns to decision point 602 and iterates as described above.

Returning to the description of decision point 602, in response to determining that a request to generate an RCA document has been detected, the process 600 retrieves a root cause analysis (RCA) rule set for guided RCA input sequence processing at block 606. The RCA rule set can include different RCA rule subsets that are usable to process the different RCA inputs segments used to create an RCA document, as described above. As also described above, the RCA rules include both quantitative rules that represent quantitative aspects of the respective RCA input segment wording and qualitative rules that represent qualitative aspects related to information technology.

At block 608, the process 600 begins an interactive guided RCA input session with the user. At block 610, the process 600 selects an RCA rule subset for the respective RCA input segment and by which to process RCA segment input. At block 612, the process 600 prompts the user for the next input of the guided input sequence.

At block 614, and in response to receipt of user input for the respective RCA input segment, the process 600 performs cognitive natural language processing (NLP) and scores the user input using the qualitative and quantitative rules of the respective RCA rule subset assigned to the particular RCA input segment. The applied scoring algorithm identifies weak keywords and weak causal connections. Further, the scoring can identify at least two quality indicators of content of unstructured user input entered during the respective RCA input segment by (i) applying natural language processing based (NLP-based) semantic analysis to the content of the unstructured user input and (ii) applying forward logical keyword connection analysis that enforces semantic consistency of the content of the unstructured user input across the guided input sequence of the RCA input segments. At decision point 616, the process 600 makes a determination, using the applied scoring algorithm that identifies weak keywords and weak causal connections, regarding whether any input errors were identified in the user input. The input errors can be assigned a criticality level distinguishing at least between critical problems and warnings.

In response to determining at decision point 616 that at least one input error has been identified, the process 600 assists the user with improving the precision and the consistency of the content of the user input using RCA segment-specific feedback at block 618. As described above, specific suggestions for improving the precision of the user input are provided based upon the particular criteria for user input during the respective RCA input segment, and based upon the applied forward logical keyword connection analysis that enforces semantic consistency of the content of the unstructured user input across the guided input sequence of the RCA input segments. The process 600 returns to block 614 to accept improved user input based upon the provided RCA segment-specific feedback, and iterates until the user input is free of input errors.

In response to determining at decision point 616 that there are no input errors, the process 600 makes a determination at decision point 620 as to whether an RCA category is identifiable from the accumulated (set) of input data including the last answer where an answer was provided during the particular RCA input segment by the user. As described above, the established computer-controlled RCA intake methodology may result in a proper categorization of the RCA category with fewer than five questions and answers. As such, each answer is evaluated to determine whether it can be considered a "last answer" for purposes of forming a comprehensive ordered set of RCA document entry criteria that are collectively usable to create an accurate RCA document, including balanced sets of questions and answers. At block 622, the process 600 applies any supplemental rules defined for processing of last answers to further confirm that the last answer results in a proper RCA category.

At block 624, the process 600 makes a determination as to whether the "last answer" for purposes of the guided input sequence has been processed. In response to determining that last answer has not yet been identified, the process 600 returns to block 610 and iterates as described above. Alternatively, in response to determining that the last answer has been identified, the process 600 generates an RCA document at block 626. The generated RCA document includes the ordered set of RCA document entry criteria obtained by the process 600 that culminates with the accurate categorization of the RCA issue.

At block 628, the process 600 validates the generated RCA document. The validation includes additional checks for RCA document storage for further processing and reuse. At block 630, the process 600 stores the validated RCA document to an RCA database, such as the RCA database 114. The process 600 returns to decision point 602 and iterates as described above.

Returning to the description of decision point 604, in response to determining that that a request to evaluate the quality of an existing RCA document has been detected, the process 600 runs a quality reviewer to detect errors using a set of qualitative and quantitative rules at block 632. The set of qualitative and quantitative rules are defined for the particular type of IT issue, and processing is performed to identify errors across the ordered set of RCA document entry criteria that are presupposed to be present within the existing RCA document.

It should be noted that an existing RCA document that was created without the benefit and use of the technology described herein may be significantly deficient with respect to any defined RCA document entry criteria. As a result, multiple RCA input segments may need to be performed to correct the existing RCA document. The technology described herein is used to correct any and all RCA input segments, and is used to insert RCA input segments that may be omitted entirely from the existing RCA document. As such, the technology described herein can be utilized to correct an entire database of existing RCA documents.

At block 634, the process 600 identifies one or more RCA input segments to correct or insert. The process 600 then returns to block 608 to begin an interactive guided RCA input sequence to correct any identified errors or to insert any omitted RCA document entry criteria, as appropriate. The process 600 iterates as described above through any identified input segments to be corrected or inserted, obtains the respective rule-compliant input at steps 610 through 624, generates a new RCA document that is fully compliant with the RCA document entry criteria at block 626, validates the RCA document at block 628, and stores the validated RCA document to the RCA database at block 630, each as described in detail above. It is understood that the process 600 may alternatively apply modifications to the existing RCA document at block 626 instead of generating a distinct new RCA document, as appropriate for a given implementation.

As such, the process 600 provides for new RCA document generation that complies with an ordered set of RCA document entry criteria. The process 600 also performs RCA document correction(s). Each branch of processing improves computer capabilities for RCA input guidance and creation, and improves information technology management as a whole.

Some embodiments of the present invention improve the technology of computers in one, or more, of the following ways: (i) an improved user interface that guides user input for RCA document creation and ensures that created RCA documents are useful and advance IT problem resolution, (ii) improved computer processing for real-time evaluation of RCA input segments in the context of proper categorization of RCAs, and (iii) improved IT management because of the improved RCA document generation provided by the technology described herein.

The present invention is not abstract because it relates particularly to computer operations and/or hardware for reasons that include the following: (i) it improves computer processing and evaluation of user inputs during RCA document generation, (ii) it provides a practical application of computing technology that both improves capabilities of the computer itself and improves IT management.

As described above in association with FIG. 1 through FIG. 6, the example systems and processes provide real-time cognitive root cause analysis (CRCA) computing. Many other variations and additional activities associated with real-time cognitive root cause analysis (CRCA) computing are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method of generating root cause analysis (RCA) documents for information technology (IT) problems comprising:
   identifying an ordered set of RCA document entry criteria, in accordance with an established computer-controlled RCA intake methodology, comprising RCA input segments specified using unstructured natural language input, the RCA input segments comprising at least: incident descriptive elements, a single problem statement, a set of why questions and answers, and a single cause categorization; and performing, interactively with a user using cognitive natural language processing (CNLP) across a guided input sequence of the RCA input segments that result in identification of a single cause categorization of a new IT problem, each of:

determining, using a scoring algorithm that identifies keywords and causal connections of a particular type, at least two quality indicators of content of unstructured user input entered during the respective RCA input segment by (i) applying natural language processing based (NLP-based) semantic analysis to the content of the unstructured user input and (ii) applying forward logical keyword connection analysis that enforces semantic consistency of the content of the unstructured user input across completed portions of the guided input sequence of the RCA input segments; and assisting, for any identified quality problems with the content of the unstructured user input entered during the respective RCA input segment based on the quality indicators, the user with improving precision and consistency of the content of the unstructured user input across the guided input sequence of the RCA input segments; and the computer-implemented method further comprising:
generating, responsive to determining that a threshold of consistent unstructured user inputs across the completed portions of the guided input sequence of the RCA input segments facilitates identification of the single cause categorization, an RCA document that comprises the content of the unstructured user input entered across the guided input sequence of the RCA input segments and that identifies the single cause categorization of the new IT problem, where one of the quality indicators determined using the scoring algorithm is based on quantitative rules representing quantitative aspects of wording used during the respective RCA input segment and another of the quality indicators is based on qualitative rules representing qualitative aspects related to information technology, and where the guided input sequence of RCA input segments increases depth of investigation of the new IT problem using the forward logical connections, and further comprising ensuring that a last answer provided by the user holds a characteristic of a root cause usable to identify the single cause categorization of the new IT problem.

2. The computer-implemented method of claim 1, where the identified quality problems are assigned a criticality level distinguishing at least between critical problems and warnings.

3. The computer-implemented method of claim 1, where applying the forward logical keyword connection analysis that enforces the semantic consistency of the content of the unstructured user input across the completed portions of the guided input sequence of the RCA input segments comprises:

comparing the content of the unstructured user input accumulated across the completed portions of the guided input sequence of the respective RCA input segments with known-accurate RCA documents; and identifying any deviations of semantic consistency of the content of the unstructured user input relative to known IT-related causal connections represented within the known-accurate RCA documents.

4. The computer-implemented method of claim 1, further comprising adding to an RCA document database the RCA document that comprises the content of the unstructured user input entered across the guided input sequence of the RCA input segments and that identifies the single cause categorization of the new IT problem.

5. The computer-implemented method of claim 1, where the identifying, the performing, and the generating are provided as a service within a cloud computing environment.

6. A system, comprising:
a memory; and
one or more processor(s) sets for generating root cause analysis (RCA) documents for information technology (IT) problems, the one or more processor(s) sets being programmed to:

identify, within the memory, an ordered set of RCA document entry criteria, in accordance with an established computer-controlled RCA intake methodology, comprising RCA input segments specified using unstructured natural language input, the RCA input segments comprising at least: incident descriptive elements, a single problem statement, a set of why questions and answers, and a single cause categorization; and perform, interactively with a user using cognitive natural language processing (CNLP) across a guided input sequence of the RCA input segments that result in identification of a single cause categorization of a new IT problem, each of: determining, using a scoring algorithm that identifies keywords and causal connections of a particular type, at least two quality indicators of content of unstructured user input entered during the respective RCA input segment by (i) applying natural language processing based (NLP-based) semantic analysis to the content of the unstructured user input and (ii) applying forward logical keyword connection analysis that enforces semantic consistency of the content of the unstructured user input across completed portions of the guided input sequence of the RCA input segments; and assisting, for any identified quality problems with the content of the unstructured user input entered during the respective RCA input segment based on the quality indicators, the user with improving precision and consistency of the content of the unstructured user input across the guided input sequence of the RCA input segments; and the one or more processor(s) sets being further programmed to:

generate, responsive to determining that a threshold of consistent unstructured user inputs across the completed portions of the guided input sequence of the RCA input segments facilitates identification of the single cause categorization, an RCA document that comprises the content of the unstructured user input entered across the guided input sequence of the RCA input segments and that identifies the single cause categorization of the new IT problem, where one of the quality indicators determined using the scoring algorithm is based on quantitative rules representing quantitative aspects of wording used during the respective RCA input segment and another of the quality indicators is based on qualitative rules representing qualitative aspects related to information technology, and where the guided input sequence of RCA input segments progressively increases depth of investigation of the new IT problem using the forward logical connections, and the one or more processor(s) sets are further programmed to ensure that a last answer provided by the user holds a characteristic of a root cause usable to identify the single cause categorization of the new IT problem.

7. The system of claim 6, where the identified quality problems are assigned a criticality level distinguishing at least between critical problems and warnings.

8. The system of claim 6, where, in being programmed to apply the forward logical keyword connection analysis that enforces the semantic consistency of the content of the unstructured user input across the completed portions of the guided input sequence of the RCA input segments, the one or more processor(s) sets are programmed to:
  compare the content of the unstructured user input accumulated across the completed portions of the guided input sequence of the respective RCA input segments with known-accurate RCA documents; and
  identify any deviations of semantic consistency of the content of the unstructured user input relative to known IT-related causal connections represented within the known-accurate RCA documents.

9. The system of claim 6, where the one or more processor(s) sets being programmed to identify, perform, and generate is provided as a service within a cloud computing environment.

10. A computer program product, comprising:
  a computer readable storage medium having computer readable program code for generating root cause analysis (RCA) documents for information technology (IT) problems embodied therewith, where the computer readable storage medium is not a transitory signal per se and where the computer readable program code when executed on a computer causes the computer to:
  identify an ordered set of RCA document entry criteria, in accordance with an established computer-controlled RCA intake methodology, comprising RCA input segments specified using unstructured natural language input, the RCA input segments comprising at
  least: incident descriptive elements, a single problem statement, a set of why questions and answers, and a single cause categorization; and
  perform, interactively with a user using cognitive natural language processing (CNLP) across a guided input sequence of the RCA input segments that result in identification of a single cause categorization of a new IT problem, each of:
  determining, using a scoring algorithm that identifies keywords and causal connections of a particular type, at least two quality indicators of content of unstructured user input entered during the respective RCA input segment by (i) applying natural language processing based (NLP-based) semantic analysis to the content of the unstructured user input and (ii) applying forward logical keyword connection analysis that enforces semantic consistency of the content of the unstructured user input across completed portions of the guided input sequence of the RCA input segments; and
  assisting, for any identified quality problems with the content of the unstructured user input entered during the respective RCA input segment based on the quality indicators, the user with improving precision and consistency of the content of the unstructured user input across the guided input sequence of the RCA input segments; and
  the computer readable program code when executed on the computer further causing the computer to:
  generate, responsive to determining that a threshold of consistent unstructured user inputs across the completed portions of the guided input sequence of the RCA input segments facilitates identification of the single cause categorization, an RCA document that comprises the content of the unstructured user input entered across the guided input sequence of the RCA input segments and that identifies the single cause categorization of the new IT problem,
  where one of the quality indicators determined using the scoring algorithm is based on quantitative rules representing quantitative aspects of wording used during the respective RCA input segment and another of the quality indicators is based on qualitative rules representing qualitative aspects related to information technology, and where the guided input sequence of RCA input segments progressively increases depth of investigation of the new IT problem using the forward logical connections, and where the computer readable program code when executed on the computer further causes the computer to ensure that a last answer provided by the user holds a characteristic of a root cause usable to identify the single cause categorization of the new IT problem.

11. The computer program product of claim 10, where the identified quality problems are assigned a criticality level distinguishing at least between critical problems and warnings.

12. The computer program product of claim 10, where, in causing the computer to apply the forward logical keyword connection analysis that enforces the semantic consistency of the content of the unstructured user input across the completed portions of the guided input sequence of the RCA input segments, the computer readable program code when executed on the computer causes the computer to:
  compare the content of the unstructured user input accumulated across the completed portions of the guided input sequence of the respective RCA input segments with known-accurate RCA documents; and
  identify any deviations of semantic consistency of the content of the unstructured user input relative to known IT-related causal connections represented within the known-accurate RCA documents.

13. The computer program product of claim 10, where the computer readable program code when executed on the computer further causes the computer to add to an RCA document database the RCA document that comprises the content of the unstructured user input entered across the guided input sequence of the RCA input segments and that identifies the single cause categorization of the new IT problem.

14. The computer program product of claim 10, where the computer readable program code when executed on the computer causing the computer to identify, perform, and generate is provided as a service within a cloud computing environment.

* * * * *